United States Patent [19]

MacLeod

[11] Patent Number: 5,300,929
[45] Date of Patent: Apr. 5, 1994

[54] METHOD FOR DELINEATING AN ANOMALOUS GEOLOGIC STRUCTURE

[75] Inventor: Mark K. MacLeod, Houston, Tex.

[73] Assignee: Chevron Research and Technology Company, San Francisco, Calif.

[21] Appl. No.: 771,298

[22] Filed: Oct. 4, 1991

[51] Int. Cl.[5] .............................................. G01V 1/40
[52] U.S. Cl. .................................. 340/853.8; 175/45; 33/309; 367/13; 367/25; 367/911; 181/104
[58] Field of Search ...................... 340/853.8; 166/250; 175/40, 45; 33/303, 309; 367/13, 25, 57, 911; 73/151; 181/102, 104

[56] References Cited

U.S. PATENT DOCUMENTS 4,646,277  2/1987  Bridges et al. ................... 340/853.8
5,128,898  7/1992  Hill et al. ............................ 181/104

Primary Examiner—J. Woodrow Eldred
Attorney, Agent, or Firm—W. K. Turner; M. W. Carson

[57] ABSTRACT

A method of using oriented seismic sensors to delineate the surface of a geologic unit having an anomalous velocity, such as salt dome is disclosed. Seismic sensors having three orthogonal axes of sensitivity are sealed in a housing and are attached to the outside of a tubing means. The tubing means is lowered into a wellbore that penetrates the geologic unit to a known depth, and a liquid such as cement is pumped through the tubing and up the annular space to fixedly attach the sensors to the geologic formation. The orientation of the sensor axes can then be calculated from an observed orientation of the reference directions of the sensor housings. Seismic wavefields are then propagated through the geologic unit and the surrounding earth, and are observed by the sensor axes of sensitivity, and are recorded and transmitted to the top of the tubing. In another embodiment, the orientation of the sensors is determined by fixedly attaching an object that emits particles in a field close to the sensor and positioning the sensor on the outside of a tubing means. The tubing means is lowered into a wellbore, and a tool is then lowered to sense and determine the direction of the radiation field and the inclination of the tubing means, to determine the orientation of the sensing device.

4 Claims, 2 Drawing Sheets

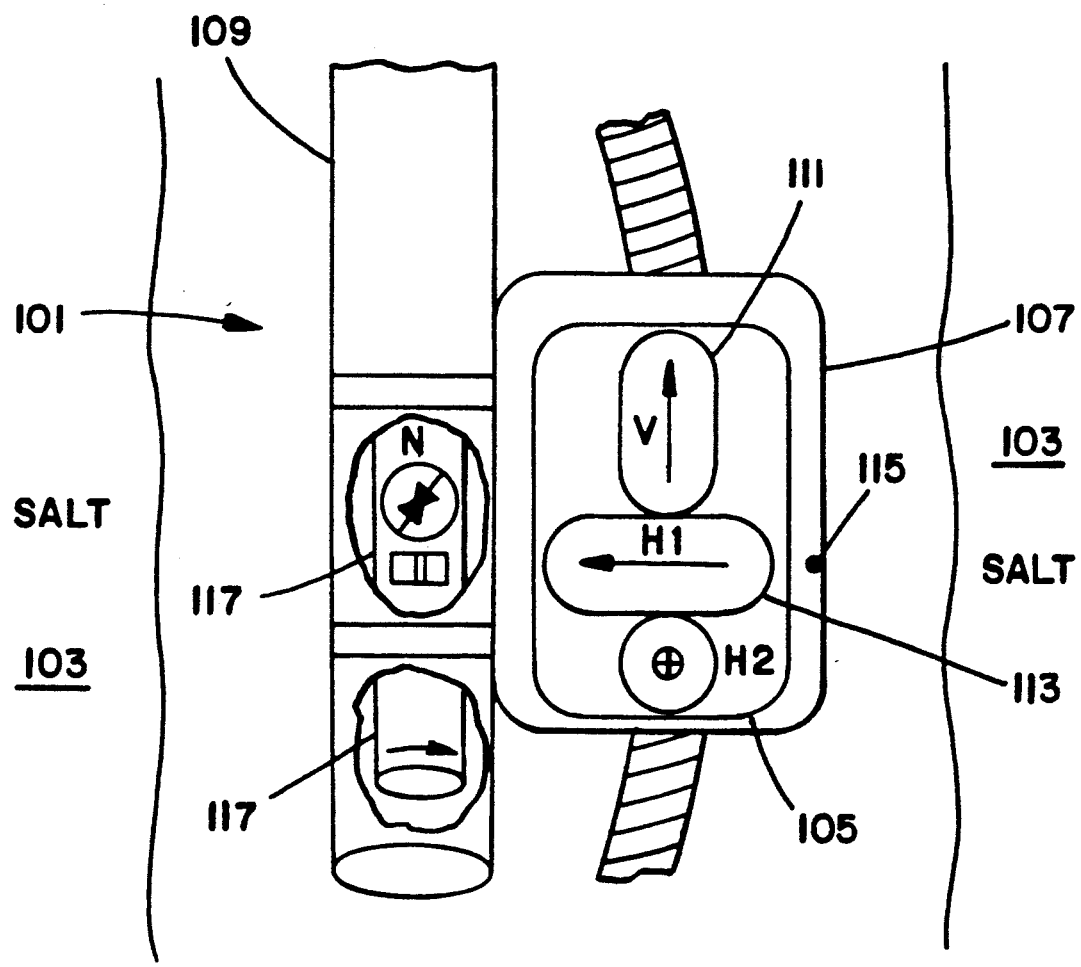
FIG_1

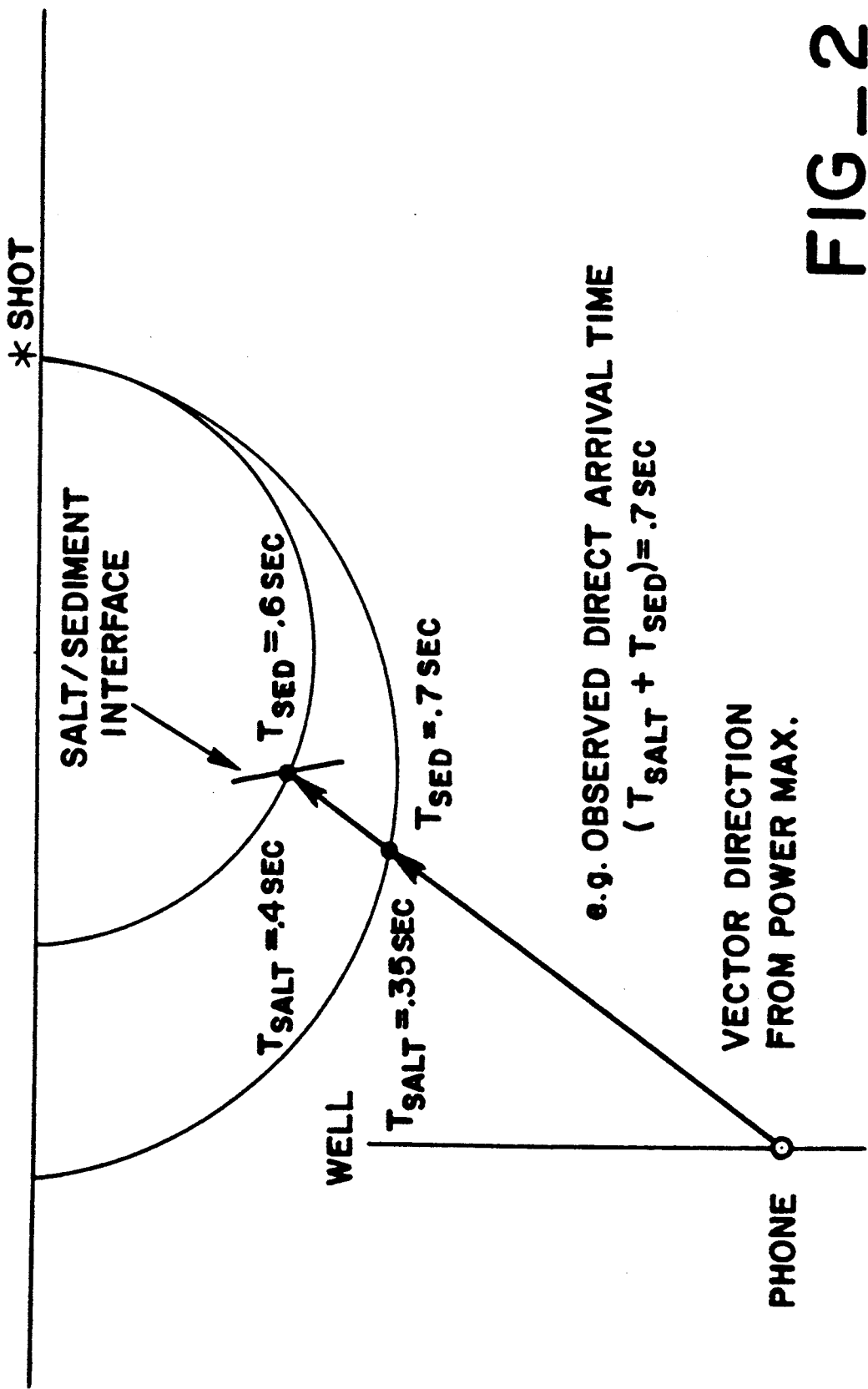
FIG_2

METHOD FOR DELINEATING AN ANOMALOUS GEOLOGIC STRUCTURE

FIELD OF THE INVENTION

The present invention relates generally to geophysical exploration for oil and gas. More specifically, this invention provides a method of using seismic sensors having a known orientation to delineate the surface of a geologic unit having an anomalous velocity. It is particularly useful to delineate the surface of a subterranean salt mass.

BACKGROUND OF THE INVENTION

An appreciable portion of the oil production in the United States is from reservoirs associated with piercement salt domes in the Gulf of Mexico region and in the Paradox Basin. The general location of the salt dome is known from surface exploration, but the locations of its flanks, especially at certain depths where possible pay sands may be truncated by the salt, are not known with an accuracy that would be sufficient for oil field development.

The geometry of the salt flank and overhang associated with quite a few of these salt domes is not precisely known. With the refocusing of the U.S. oil industry in the direction of development drilling and a de-emphasis on exploration, there has been a resurgence in interest to define these producing salt dome geometries more exactly. This will ultimately allow a better quantification of any unrealized updip hydrocarbon potential associated with these producing fields.

In specific areas however, such as the East Texas Basin, the salt dome flanks are relatively unexplored. Seismic surveys refracting energy through the salt and then recording the wavefield in an adjacent well (known as salt proximity surveys), are of limited use in this area. The high sedimentary rock velocities encountered relatively shallow in the stratigraphic section preclude the success of the downhole refraction technique to aid in defining the salt flank geometry.

Since the 1930's, two types of borehole seismic surveys have been used to define the shape of salt domes—radial refraction surveys and proximity surveys (McCollum and LaRue, "Utilization of Existing Wells in Seismograph Work," Amer. Assn. of Petroleum Geologists Bull. 5, No. 12, pp. 1409–1417, 1931). In the radial refraction survey, (such as the surveys disclosed by L. W. Gardner in "Seismograph Determination of Salt-dome Boundary Using Well Detector Deep on Dome Flank," *Geophysics*, V. 14, pp. 29–38, 1949), a downhole three component (3C) phone is placed inside a salt dome usually at a depth greater than the objective depth. Typically, an exploration well that drilled on the flank of the dome and bottomed in or near salt is used as the receiver well. Shots are fired in a pattern resembling spokes radiating from the opposite flank of the dome. Since these surveys were carried out before the development of downhole gyroscopes, the geophone orientation was not known. Only travel time is provided as output, and the interpreter has to estimate the sediment velocities, to generate a 3-dimensional surface of possible solutions. Several seismic shots are needed so that these 3-D surfaces can be lined up. Using the direct arrival time and salt and sediment velocities, the surface of all solutions that fit the observed time is displayed in either vertical or horizontal slices. The tangent to these "aplanatic" surfaces provides the estimate of the salt-sediment interface.

However, conducting a radial refraction survey with wireline tools and gyroscopic orientation has severe drawbacks. The cost is excessive. A 20-level radial refraction survey with over 200 source points recorded into a single geophone string, with offsets up to 20,000 feet and a wide azimuth range would not be economically feasible with prior art procedures. Shots would have to be repeated at each level, so 200 source points with 20 levels would require 4000 shots.

Proximity surveys are designed to image the salt flank very near the wellbore. In this method, a source is placed over the top of a dome with a downhole 3C geophone in sediments on the flank of the dome. Since the 1980's, these surveys have been recorded with a gyroscopically oriented 3C phone which reduces the range of possible solutions for the salt-sediment interface from an ambiguous 3D aplanat to a unique point in space. The use of gyroscopes to determine the orientation of geophones in a wellbore is disclosed in U.S. Pat. No. 4,800,981 issued to Uttecht et al. and by A. Manzur in "Delineation of Salt Masses Using Borehole Seismics" in the *Oil and Gas Journal*, Oct. 7, 1985.

A proximity survey only provides useful information pertaining to the location of a salt flank that is within a few hundred feet from the wellbore. Therefore, only a very narrow vertical slice of information along the well path is obtained.

The prior work is limited in the attempts at delineating the flanks of a salt mass in that no suitable method can economically and accurately delineate the salt mass flanks over large portions of the salt mass. A 3D surface seismic survey would provide adequate results, but would cost at least ten times as much. There is, therefore, a need for such a method for use in the geophysical exploration for oil and gas.

SUMMARY OF THE INVENTION

The present invention is surprisingly successful in providing a method for delineating the surface of a geologic unit that has an anomalous velocity, using geophones that have known orientations. It is especially useful in geophysical exploration for oil and gas around the flanks of a salt dome. The method economically and accurately delineates the salt flanks over a large portion of the salt mass.

In one aspect of the invention, at least one seismic sensor is attached to the outside of a tubing means which has top and bottom ends. Each sensor has three orthongonal axes of sensitivity and is hermetically sealed in a housing whereby the axes have orientations that are fixed in relation to the housing.

The tubing means is lowered into a wellbore which penetrates the geologic unit of interest. A liquid which solidifies upon remaining motionless is then pumped completely through the tubing means and up, outside the tubing to a height whereby the surface of the liquid is above all of the sensors.

The orientations of each of the axes of each of the sensors is calculated from an observed orientation of each of the housings. At least one seismic wavefield is emanated from at least one seismic source point, wherein the wavefields are propagated through the geologic unit of interest and the surrounding earth, and are observed at each orthogonal axis of each sensor. The wavefields are then separately recorded along each of the orthogonal axes at each of the sensors. The recorded wavefields are then transmitted to the top of the tubing means via the electrical connection.

In another aspect of the invention, the orientation of a sensing device such as a three component geophone is determined. An object that naturally emits particles in a field, such as a magnet, is fixedly attached close to and with known orientation with respect to the sensing device. The sensing device is then fixedly positioned to the outside of the tubing means, and the tubing means is lowered into the wellbore to a known depth. A tool that has a sensing mechanism that can observe the direction of the emitted field is lowered to a depth such that the orientation of the field can be determined, and the tool then records such orientation to determine the orientation of the sensing device.

The above and other embodiments, objects, advantages, and features of the invention will become more readily apparent from the following detailed description of the invention, which is provided in connection with the accompanying drawings.

DESCRIPTION OF THE DRAWINGS

FIG. 1 is a schematic, sectional view that illustrates the inventive method of determining the orientation of a sensing device.

FIG. 2 is a schematic drawing that shows a ray trace migration technique for the direct arrival wave, to map a salt-sediment interface.

DETAILED DESCRIPTION OF THE INVENTION

In accordance with the present invention, a new improved method for using oriented seismic sensors to delineate the surface of a geologic unit having an anomalous velocity has been developed.

The present invention utilizes a field layout that is similar to a radial refraction survey. Data analysis, however, is like the data analysis in a proximity survey. At least one three component (3C) geophone is permanently emplaced, at a known orientation inside a wellbore that penetrates a salt dome, at a depth roughly equal to the depth of hydrocarbon exploration interest (the objective depth). It is preferable to use a string of oriented geophones.

Referring to FIG. 1, a novel method for determining the orientation of a sensing device, such as a 3C geophone, in a wellbore has been developed. Wellbore 101 has penetrated a salt dome 103. Three component geophone 105 has been hermetically sealed in a mold 107 and fixedly positioned to the outside of a tubing means 109, such as a string of drill pipe or production tubing. Polyurethane is a particularly useful substance from which to create the mold 107. The mold 107 surrounds the geophone and allows the geophone 105 to be rigidly attached to the tubing means 109. It is desireable that the vertical phone 111 be oriented parallel to the longitudinal direction of the tubing means 109 and one of the horizontal phones 113 be oriented perpendicular to the longitudinal direction of the tubing means 109.

An object 115 that naturally emits particles at a nearly constant rate in a field, such as a magnet, is fixedly attached close to and with known orientation with respect to the 3C geophone 105. Such a field is hereby defined as a radiation field. The radiation field is further defined to be omnidirectional, that is, resulting from being emitted in spherically concentric rings, and the emitting object 115 emits from a known position with respect to the geophone 105.

Tubing means 109 is then lowered into the borehole to a known depth. A tool 117 having a sensing mechanism that can observe the emitted radiation field is then lowered into the tubing means 109 to a depth such that the direction of the radiation field can be determined. The tool 117 then records the direction of the radiation field to thereby determine the orientation of the geophone. A magnetometer is particularly useful to observe the emitted radiation field if a magnet is used to emit such a field. The tool has a customized slit, which is caused to rotate, thereby observing the emitted field. Such tools that are able to be lowered through tubing are known in the well logging art. Orientation of the tool 117 and thus the slit, as well as the depth of the emitting device, can be determined by the use of gyroscopes, as is known in the well logging art. The inclination of the tubing means is also determined at the position of the emitting device.

It is a further object of the present invention to use seismic sensors of known orientation to delineate the surface of a geologic unit that has an anomalous velocity, such as a salt dome.

At least one seismic sensor is fixedly attached to the outside of a tubing means which has a top end and a bottom end. A three component geophone is a particularly useful seismic sensor. Each seismic sensor has three orthogonal axes of sensitivity, and each sensor is placed in a separate hermetically sealed housing such that the axes have known orientations with respect to the reference direction of the sealed housing. A polyurethane mold is particularly useful to hermetically seal the seismic sensors.

The sensors are then electrically connected to the top end of the tubing means so that electronic signals can be transmitted from each of the sensors to the top end of the tubing means.

The bottom end of the tubing means is then lowered into a wellbore which penetrates the geologic unit that has an anomalous velocity. A liquid is then pumped through the tubing means so that nearly all of the liquid is forced out of the bottom end of the tubing means and is forced up the borehole, in the annular space between the outside of the tubing means and the geologic formations. The liquid is pumped to reach an elevation whereby all the housings are beneath the surface of the liquid. The liquid is comprised of a material that solidifies upon remaining motionless, such as cement. The type of cement and method for emplacing the cement are known in the well drilling art. A thixotropic mud may also be used as the liquid. This would allow a later retrieval of the sensors. Once the liquid solidifies, the sensor housings are now fixedly emplaced, and are in solid contact with the surrounding geologic formations.

The orientation of each of the orthogonal axes of the sensors is now calculated by observing the orientations of the reference direction of each of the sensor housings with respect to an Earth-based reference. The method for determining the orientation of a sensing device recited above is a particularly useful method to calculate the orientation of the orthogonal axes of the sensors.

In another embodiment, the sensors are fixedly attached to the outside of the tubing means so that one axis is nearly parallel to the length of the tubing, and that one axis is perpendicular to the length of the tubing.

Seismic data shooting and acquisition can now commence. One or more seismic wavefields are caused to emanate from one or more seismic source points, wherein the seismic wavefields are propagated first through the surrounding earth, and then through the geologic unit having the anomalous velocity, and are observed at the orthogonal axes of sensitivity at the sensors. The observed wavefields are separately recorded along each orthogonal axis of each sensor, and the recorded wavefields are then electrically transmitted to the top of the tubing means for further analysis.

DATA PROCESSING

Once the data has been acquired using the present inventive method, the data can be processed and analyzed to permit the interpreter to delineate the surface of the anomalous geologic unit, such as a salt dome.

Given three traces that were obtained from 2 horizontal geophones and one vertical geophone, a program that finds the rotation angle that maximizes the power of the direct arrival event in a given time window is then utilized. Such programs are known in the seismic processing art. When the program is applied to the direct arrival, the incident angle of the direct arrival at the phone string can be determined.

After the incident angle of the direct arrival has been determined, the position of the salt-sediment interface can be mapped using a ray trace migration scheme. The first step is to build a traveltime look-up table for the raypaths in sediment. This entails tracing a fan of rays from the shot location using sediment velocity and storing the times and offsets for each ray at a finely sampled range of depths. The second step is to trace a ray from the geophone at salt velocity and the incidence angle found above. At small time steps along the salt raypath, the salt ray is connected to the appropriate sediment raypath given the depth and offset at the end of the salt ray. If the time in salt and sediment adds up to the observed time then a solution for the salt-sediment interface is found. If not, the salt ray continues until such time that the salt and sediment times add up to the observed time as illustrated in FIG. 2. FIG. 2 shows a ray trace migration technique for the direct arrival wave, to map a salt-sediment interface.

For each trace, this method provides a single point on the salt dome in 3D. Using Snell's Law, the strike and dip of the salt flank can also be calculated. This could help one decide which points are valid and can aid in mapping the salt flank.

The inventive method assumes the salt and sediment velocities are laterally invariant and isotropic. It is sensitive to the absolute pick time and the velocity model, particularly for the slower sediments. One could use known salt points to refine the sediment velocity model. If the migrated points did not agree with known salt points, the sediment velocities could be modified until a match was found.

While a preferred embodiment of the invention has been described and illustrated, it should be apparent that many modifications can be made thereto without departing from the spirit or scope of the invention. Accordingly, the invention is not limited by the foregoing description, but is only limited by the scope of the claims appended hereto.

What is claimed is:

1. A method of determining the orientation of a sensing device in a wellbore comprising the steps of:
   (a) fixedly positioning said sensing device to the outside of a tubing means;
   (b) fixedly attaching an object that emits radiation in a radiation field, close to and with known orientation with respect to said sensing device, said radiation field emitting from a known position with respect to said sensing device;
   (c) lowering said tubing means into said wellbore to a known depth;
   (d) lowering a tool having a sensing mechanism that can observe said emitted radiation field, into said tubing means to a depth such that the direction of said radiation field can be determined; and
   (e) recording the direction of said radiation field and the inclination of said tubing means at this position, to determine said orientation of said sensing device.

2. The method as defined by claim 1, whereby said object that emits radiation is a magnet.

3. The method as defined by claim 2, whereby said sensing mechanism is a magnetometer.

4. The method as defined by claim 1, whereby a liquid that solidifies upon remaining motionless is pumped through said tubing means and is forced up, outside said tubing means to an elevation such that all of said sensors are below the surface of said liquid, after step (c) above and before step (d) above.

* * * * *